United States Patent [19]

Carasso

[11] 3,896,716
[45] July 29, 1975

[54] APPARATUS FOR EXPANDING FOOD PRODUCTS

[75] Inventor: Daniel Carasso, Neuilly-sur-Seine, France

[73] Assignee: Compagnie Gervais-Danone, Levallois-Perret, France

[22] Filed: Mar. 19, 1974

[21] Appl. No.: 452,533

Related U.S. Application Data

[63] Continuation of Ser. No. 227,771, Feb. 22, 1972, abandoned.

[30] Foreign Application Priority Data

Feb. 19, 1971  Luxemburg............................ 62640

[52] U.S. Cl. ...................................... 99/452; 99/60
[51] Int. Cl. .............................................. A23c 9/00
[58] Field of Search ............ 99/452, 453, 455, 468, 99/470, 454, 456, 483; 62/10; 426/313

[56] References Cited
UNITED STATES PATENTS

| | | | |
|---|---|---|---|
| 2,343,767 | 3/1944 | Getz | 99/136 |
| 2,713,253 | 7/1955 | Chandler | 99/60 |
| 2,838,288 | 6/1958 | Stoeling | 99/453 |
| 3,068,105 | 12/1962 | Morrison | 99/60 |
| 3,251,405 | 5/1966 | Hallstrom | 99/452 |
| 3,681,930 | 8/1972 | Tyree, Jr. | 62/10 |
| 3,713,841 | 1/1973 | MacManus | 99/60 |

*Primary Examiner*—Robert Jenkins
*Attorney, Agent, or Firm*—Brisebois & Kruger

[57] ABSTRACT

Apparatus for expanding food products comprises a mixing tube, a pump for pumping food into the tube and a nozzle for introducing gas into the tube downstream of the pump. The pressure at the outlet of the tube is regular in dependence on the pressure at the input end of the tube to maintain a substantially constant pressure drop in the tube.

8 Claims, 1 Drawing Figure

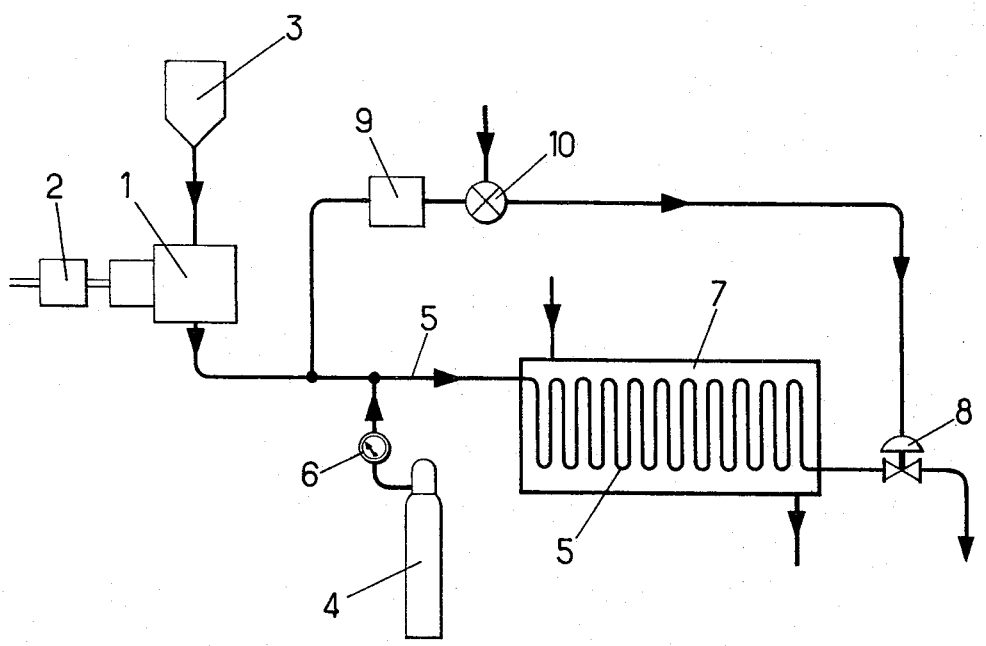

APPARATUS FOR EXPANDING FOOD PRODUCTS

This is a continuation of application Ser. No. 227,771, filed Feb. 22, 1972, now abandoned.

SUMMARY OF THE INVENTION

This invention relates to apparatus for expanding food products, such as dairy products containing stabilizers, by dissolving gas under high pressure in the product and then expanding it under atmospheric pressure.

It is advantageous to expand dairy products by the release of gas which has been first dissolved therein under pressure. The known processes used for this purpose have the advantage over conventional mechanical expansion processes that they permit the expansion of dairy products regardless of the percentage of fatty material therein. It is thus possible to expand by the dissolution of gas dairy products having a very low content of fatty matter.

The simplest apparatuses for expanding by the dissolution of gas are pressurized containers of the aerosol bomb type, provided with a valve, and adapted to produce a whipped cream, for example. The pressures used are relatively low, of the order of 5 to 7 bars, and it is therefore preferred to use gases having a high solubility in water, such for example as $N_2O$, $CO_2$, or Freons. The expanded products obtained must then be promptly consumed, because a gas having a high solubility in water diffuses in air at atmospheric pressure, which results in contraction of the product within a few hours.

The dissolution at high pressure of gases having a low solubility in water may also be carried out in a known manner by spraying the liquid dairy product into a chamber holding the gas at high pressure.

It is also known to carry out the high pressure dissolution in a tubular chamber provided with baffles or the like adapted to improve the mixing and dissolution. An adjustably loaded outlet valve or similar device is positioned at the outlet of the mixing chamber. This apparatus has the disadvantage of being particularly difficult to clean.

All the known devices which permit the dissolution of gases having a low solubility have the major disadvantage of being incapable of producing an expanded product of constant quality. The expansion ratio varies very rapidly within a broad range. In effect, it is impossible to determine exactly the quantity of gas to be introduced into the product, and experience shows that a large excess of gas does not produce the result theoretically expected that is to say a stable expansion ratio.

The expansion ratio, which is defined as the ratio of the volume of the expanded product to the volume of the liquid product before expansion, depends on the temperature, on the pressure, and on the percentage of dissolution of gas in the liquid product. In the known expansion devices, it is not possible to readily control these different parameters to obtain a constant expansion ratio. The difficulty is increased by the fact that certain of the products used contain stabilizers which result in a large variation in viscosity in response to changes in temperature. The expansion ratio obtained also varies with this variation in viscosity since it depends on the pressure in the mixing chamber which is a function of the pressure drop.

The present invention makes it possible to overcome these disadvantages and obtain a product the expansion ratio of which remains constant within 10% of a desired ratio, which may reach and even exceed 3 to 1, said product having good organoleptic properties, by utilizing an apparatus of simple construction and reliable operation. The apparatus according to the invention also has the advantage of being very easy to clean and maintain under excellent hygienic conditions.

The apparatus for expansion by dissolving gas at high pressure in accordance with the present invention comprises essentially in combination a hopper for introducing the product while warm, a high pressure, which preferably delivers metered quantities of material, a smooth tube of small diameter and substantial length, which may be cooled, and a pressure regulating valve automatically controlled by a pressure detector positioned upstream of a nozzle for injecting gas under pressure.

The gases used in the apparatus according to the invention are gases having a very low solubility in water, preferably less than 20 $cm^3/100$ ml of water at 0°C, so as to avoid contraction of the product at atmospheric pressure due to diffusion of gas into the air. Suitable gases are, for example, nitrogen, air, and argon.

In order to obtain a consistent expansion ratio, it is first necessary to ensure that the proportion of gas injected into the liquid product is constant if the output of the product does not vary, as is the case if a metered-volume pump is used. In the apparatus according to the present invention the gas is injected at a pressure greater than the pressure in the liquid and at the output of the metered-volume pump. An essential characteristic of the apparatus according to the invention consists in maintaining the pressure difference between the gas and the liquid constant by means of a pressure regulating valve at the output of the apparatus controlled by a detector positioned at the outlet of the metered-volume pump and upstream of the gas injection nozzle. In this manner the inevitable variations in temperature and viscosity inside the tube do not influence the expansion ratio of the product obtained at the output of the apparatus according to the invention.

The dissolution of the gas at high pressure in the liquid product is obtained as the result of both a suitable time during which the product and the gas remain in the tube and a substantial agitation created by the turbulence of the two-phase flow. According to an important characteristic of the invention, the length of the tube and the volume of flow of the metered-volume pump are such that the time during which the product remains in the tube is at least one second.

It is advantageous to use a tube of small diameter and serpentine shape positioned in a chamber constituting a heat exchanger. In a preferred embodiment of the apparatus according to the invention the product is introduced at high temperature which makes it possible to maintain excellent hygiene while decreasing its viscosity, which increases the turbulence. It is nevertheless desirable to cool the product before the decrease in pressure which results in the expansion itself. In effect, if the product is not cooled, the texture obtained will be poor and it will have the appearance of a rigid gel. The cold expansion, on the contrary, makes it possible to obtain a creamy texture, which is not jellified. In this embodiment, water at low temperature is circulated in the heat exchanger so that the temperature of the product at its outlet may be at most 25°C and preferably less than 10°C.

In another embodiment of the apparatus according to the invention, the serpentine tube extends through two successive heat exchangers, which makes it possible to provide supplementary heating to the pasteurization temperature in the upstream heat exchanger and cooling in the downstream heat exchanger.

This embodiment of the apparatus according to the invention makes it possible to pasteurize at the same time that the expansion is carried out. In order to obtain a creamy texture the cooling must be such that the temperature of the product at the outlet is not in excess of 25°C and preferably less than 10°C.

The invention will be better understood from a consideration of the accompanying drawing which schematically represents a representative embodiment of the apparatus according to the invention, and from a study of the following examples.

As shown on the FIGURE, the expansion apparatus comprises a metered-volume, high-pressure pump 1 driven by a motor 2 and supplied with a dairy product at a relatively high temperature from a supply hopper 3. The high pressure gas in the bottle 4 is introduced into the smooth narrow tube 5 through an expansion valve 6 so that the pressure of the expanded gas is greater than the pressure of the dairy product at the outlet of the volumetric pump 1.

The tube 5 is serpentine in shape and positioned in the heat exchanger 7. The automatic pressure regulating valve 8 at the outlet of the serpentine 5 is controlled by the pressure detector 9 which measures the pressure of the dairy product at the outlet of the metered-volume pump 1 and upstream of the gas injection nozzle. The pressure of the dairy product at the outlet of the smooth tube 5 and, consequently, the expansion ratio may thus be kept constant within about 10% of a predetermined value set by the control device 10.

EXAMPLE 1

The dairy product introduced through the metered-volume pump is a mixture containing 76 parts of a sterilized milk having a fat content of 113 grams per liter, 13.8 parts of saccharose, 7.1 parts of glucose, 1 part of starch, 0.05 parts of a gum or hydrophilic colloidal stabilizer, 0.15 parts of carraghenates, 0.3 parts of gelatin, 1.2 parts of liquid coffee extract, and 0.3 parts of soluble powdered coffee extract.

The pressure of the dairy product at the outlet of the metered-volume pump is 80 bars. Nitrogen at a pressure of 95 bars is injected into the dairy product.

The diameter of the tube in which the gas is dissolved is 10 mm, and the total length of the developed serpentine is 80 meters. The rate of flow of the metered-volume pump is 400 liters per hour. The time the product and the gas remain in the serpentine is thus one minute.

The heat exchanger 7 of the FIGURE is divided into two parts. The first or upstream heat exchanger is cooled by water and the second or downstream heat exchanger is cooled by ice water. The temperature conditions are shown in Table I.

TABLE I.

| Temperature produced | |
|---|---|
| Entrance first heat exchanger | 70°C |
| Outlet first heat exchanger | 40°C |
| Inlet second heat exchanger | 40°C |
| Outlet second heat exchanger | 8°C |

TABLE I.-Continued

| Water temperature | |
|---|---|
| Inlet first heat exchanger | 20°C |
| Outlet first heat exchanger | 35°C |
| Inlet second heat exchanger | 1.5°C |
| Outlet second heat exchanger | 6°C |

The pressure of the product at the outlet of the second heat exchanger is 60 bars. The expansion ratio of the product is between 1.8 and 1.9 to 1. After the expansion, the product is received in the hopper of a treatment machine not shown in the drawing. The resulting product has a creamy texture and the expansion ratio is very stable. The product may be frozen and unfrozen several times without impairing its organoleptic properties or its initial structure, especially without contraction, without substantial syneresis, and without any formation of ice crystals of substantial size, but only a very fine crystallization. This product may also be stored without loss of these qualities for 8 to 10 days at a temperature of 4° to 8°C.

EXAMPLE 2

The dairy product introduced into the metered-volume pump is a mixture of the following:

| | |
|---|---|
| Milk containing 15 g of fatty matter per liter | 50% |
| Skimmed milk powder | 0.9% |
| Cream at 320 g of fatty matter per liter | 24% |
| Sugar | 11.8% |
| Glucose | 4.4% |
| Gelatin | 0.3% |
| Carraghenates | 0.3% |
| Starch | 0.5% |
| Chocolate | 7% |
| Cocoa | 0.9% |

The temperature of the product at the outlet of the pump is 70°C and its pressure 70 bars.

Argon at a pressure of 80 bars is injected into the product. The serpentine used is the same as in Example 1, as are the rate of flow through the pump and the temperature conditions in the heat exchangers.

The expansion ratio obtained is 2.35 to 1, plus or minus 10%.

The product obtained has a creamy texture. It is adapted to be distributed and consumed in the fresh state within from 8 to 10 days and undergo several freezings and un-freezings successively without loss of its organoleptic properties or its final structure, and without any formation of large ice crystals during the freezing, but only very fine crystallization.

EXAMPLE 3

The dairy product introduced through the metered-volume pump is the same as that of Example 2. The temperature of the product at the outlet of the pump is 70°C and its pressure 50 bars. Argon at a pressure of 60 bars is injectd into the product. The serpentine used is the same as the one used in Example 1, as are the rate of flow of the pump and the temperature conditions in the heat exchangers. The expansion ratio is 2 to 1, plus or minus 10%. The product obtained has a creamy texture. It is adapted to be distributed and consumed fresh for 8 to 10 days and undergo several successive freezings and un-freezings without losing its organoleptic properties or its initial structure, and without any formation of large ice crystals during freezing, but only a very fine crystallization.

EXAMPLE 4

64 parts of skimmed milk, 2.3 parts of skimmed milk powder, and 8 parts of fatty material from milk, are mixed with agitation in a vat and homogenized and pasteurized at 90°–95°C. After cooling to 44°C, one part of yogurt ferment is added. The fermentation then takes place over a period of several hours, preferably three to five hours, until acidity occurs at about 80°C. This produces a yogurt base. There is then added to the mixture, while stirring, 12 parts of saccharose, 11.5 parts of cerelose, 0.6 parts of gelatin, 0.1 parts of a hydrophilic colloid stabilizer, and 0.5 parts of strawberry flavoring, and the mixture is introduced into the apparatus according to the invention. The apparatus used is the same as in Example 1, as are the conditions of pressure on the dairy product and the nitrogen injected, the rate of flow of the pump, and the characteristics of the coil.

The heat exchanger 7 of the FIGURE is replaced by a first or upstream heat exchanger in which the temperature of the product is increased to produce pasteurization. A second or downstream heat exchanger is used to reduce the temperature of the product before its expansion.

The temperature conditions of the product and the water which transfers the heat are as follows:

TABLE II.

| Temperature of product | |
|---|---|
| Inlet of first heat exchanger | 40°C |
| Outlet of first heat exchanger | 68°C |
| Inlet second heat exchanger | 68°C |
| Outlet second heat exchanger | 13°C |
| Water temperature | |
| Inlet of first heat exchanger | 72°C |
| Outlet of first heat exchanger | 70°C |
| Inlet of second heat exchanger | 1.5°C |
| Outlet of second heat exchanger | 6°C |

The pressure of the product at the outlet of the second heat exchanger is 60 bars. The expansion ratio obtained is between 1.8 and 1.9 to 1. The product obtained has excellent organoleptic properties. It may be stored fresh or frozen and, in this case, may be frozen and unfrozen several times while retaining its initial structure. When consumed in the fresh state it is light in weight and creamy but firm.

The product is not fluid below 10°C. It is slightly fluid above 10°C. It has a slightly acidulous taste. In the frozen state it is a frozen product having a fine crystallization structure which separates easily from the spoon.

The apparatus for expanding by dissolution of gas in accordance with the present invention makes it possible to provide expanded products of constant quality. The apparatus may be used whenever it is desired to obtain an expansion ratio which is constant which may be as high as three to one and even more. The product may be introduced into the apparatus while hot, so that the conditions of hygiene are kept at a high level. Moreover, the apparatus is very easy to clean because the tube used is smooth throughout its length. The apparatus according to the invention may be used to expand products to be frozen, such as ice-creams, sherberts, etc.

What is claimed is:

1. In an apparatus for expanding a food product comprising means for mixing said food product with a gas; pump means connected to supply said food product to said mixing means under pressure; means for introducing said gas into said mixing means downstream of said pump means at a pressure greater than that at which said pump supplies said food product; and pressure-regulating outlet valve means downstream of said mixing means through which a mixture of said food product and said gas emerges from said mixing means; the improvement which comprises pressure responsive control means responsive to the pressure of said food product upstream of said gas introducing means but downstream of said pump means, said control means being connected to said pressure-regulating valve means to control the opening of said valve means in dependence on said food product pressure and thereby maintain a substantially constant pressure drop between said pump and outlet valve.

2. Apparatus as claimed in claim 1 in which said mixing means comprises a smooth tube having a length such that substantially complete saturation of the gas in the food product is attained before the product reaches said outlet valve means.

3. Apparatus as claimed in claim 2 in which said tube is a serpentine.

4. Apparatus as claimed in claim 1 which comprises at least one heat exchanger through which said mixing means extends.

5. Apparatus as claimed in claim 4 comprising cooling means through which said mixing means extends.

6. Apparatus as claimed in claim 4 which comprises successive heating and cooling means through which said mixing means extends.

7. Apparatus as claimed in claim 1 in which said pump means is a metering high pressure pump.

8. An apparatus for preparing a volume inflated dairy product comprising stabilizers with a substantially constant expansion ratio by dissolution in said product of a high pressure gas having a low solubility in water, comprising metering high pressure pump means for producing a predetermined rate of flow of said product; injection means downstream of said pump means for injecting said gas into said product at a higher pressure than that of said product; mixing means downstream of said injection means comprising a smooth tube having a small diameter and a substantial length; pressure detector means located upstream of said injection means and downstream said pump means; and a pressure regulating valve means located at the end of said smooth tube and operatively connected to said pressure detector means so that said valve is actuated in dependence on said product pressure.

\* \* \* \* \*